(12) United States Patent
Panzer et al.

(10) Patent No.: US 11,320,272 B2
(45) Date of Patent: May 3, 2022

(54) LOCALIZATION ADAPTATION BASED ON WEATHER ESTIMATION

(71) Applicant: Waymo LLC, Mountain View, CA (US)

(72) Inventors: Samuel Panzer, Ann Arbor, MI (US); Michael Montemerlo, Mountain View, CA (US); Michael James, Northville, MI (US)

(73) Assignee: Waymo LLC, Mountain View, CA (US)

( * ) Notice: Subject to any disclaimer, the term of this patent is extended or adjusted under 35 U.S.C. 154(b) by 133 days.

(21) Appl. No.: 16/922,052

(22) Filed: Jul. 7, 2020

(65) Prior Publication Data

US 2022/0011116 A1 Jan. 13, 2022

(51) Int. Cl.
*G01C 21/30* (2006.01)
*G01S 13/89* (2006.01)
*G05D 1/02* (2020.01)
*B60W 60/00* (2020.01)

(52) U.S. Cl.
CPC .......... *G01C 21/30* (2013.01); *B60W 60/001* (2020.02); *G01S 13/89* (2013.01); *G05D 1/0274* (2013.01); *B60W 2555/20* (2020.02)

(58) Field of Classification Search
CPC ................................ G01C 21/30; G01S 13/89
See application file for complete search history.

(56) References Cited

U.S. PATENT DOCUMENTS

| 8,949,024 | B2 | 2/2015 | Stanley et al. |
| 9,235,214 | B2 | 1/2016 | Anderson |
| 9,811,091 | B2 | 11/2017 | Dolgov et al. |
| 2018/0024562 | A1* | 1/2018 | Bellaiche .................. G06T 7/73 701/26 |
| 2021/0129868 | A1* | 5/2021 | Nehmadi ............ G06F 16/9035 |
| 2021/0237761 | A1* | 8/2021 | Das ....................... G06K 9/6288 |

OTHER PUBLICATIONS

Guillaume Bresson, et al., Simultaneous Localization and Mapping: A Survey of Current Trends in Autonomous Driving, IEEE Transactions on Intelligent Vehicles, Institute of Electrical and Electronics Engineers, 2017, XX, pp. 1.

\* cited by examiner

*Primary Examiner* — Tan Q Nguyen
(74) *Attorney, Agent, or Firm* — Botos Churchill IP Law

(57) ABSTRACT

Aspects of the disclosure provide for localizing a vehicle. In one instance, a weather condition in which the vehicle is currently driving may be identified. A plurality of sensor inputs including intensity information, elevation information, and radar sensor information may be received. For each of the plurality of sensor inputs, an alignment score is determined by comparing the intensity information, elevation information, and radar sensor information to a corresponding pre-stored image for each of the intensity information, the elevation information, and the radar sensor information. A set of weights for the plurality of sensor inputs may be determined based on the identified weather condition. The alignment scores may then be combined using the set of weights in order to localize the vehicle.

20 Claims, 10 Drawing Sheets

"INTENSITY"

"INTENSITY"

"ELEVATION"

"ELEVATION"

"RADAR SENSOR DATA"

"RADAR SENSOR DATA"

LOCALIZATION ADAPTATION BASED ON WEATHER ESTIMATION

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings. This data can be used to localize the vehicle relative to pre-stored map information.

SUMMARY

Figure 1:
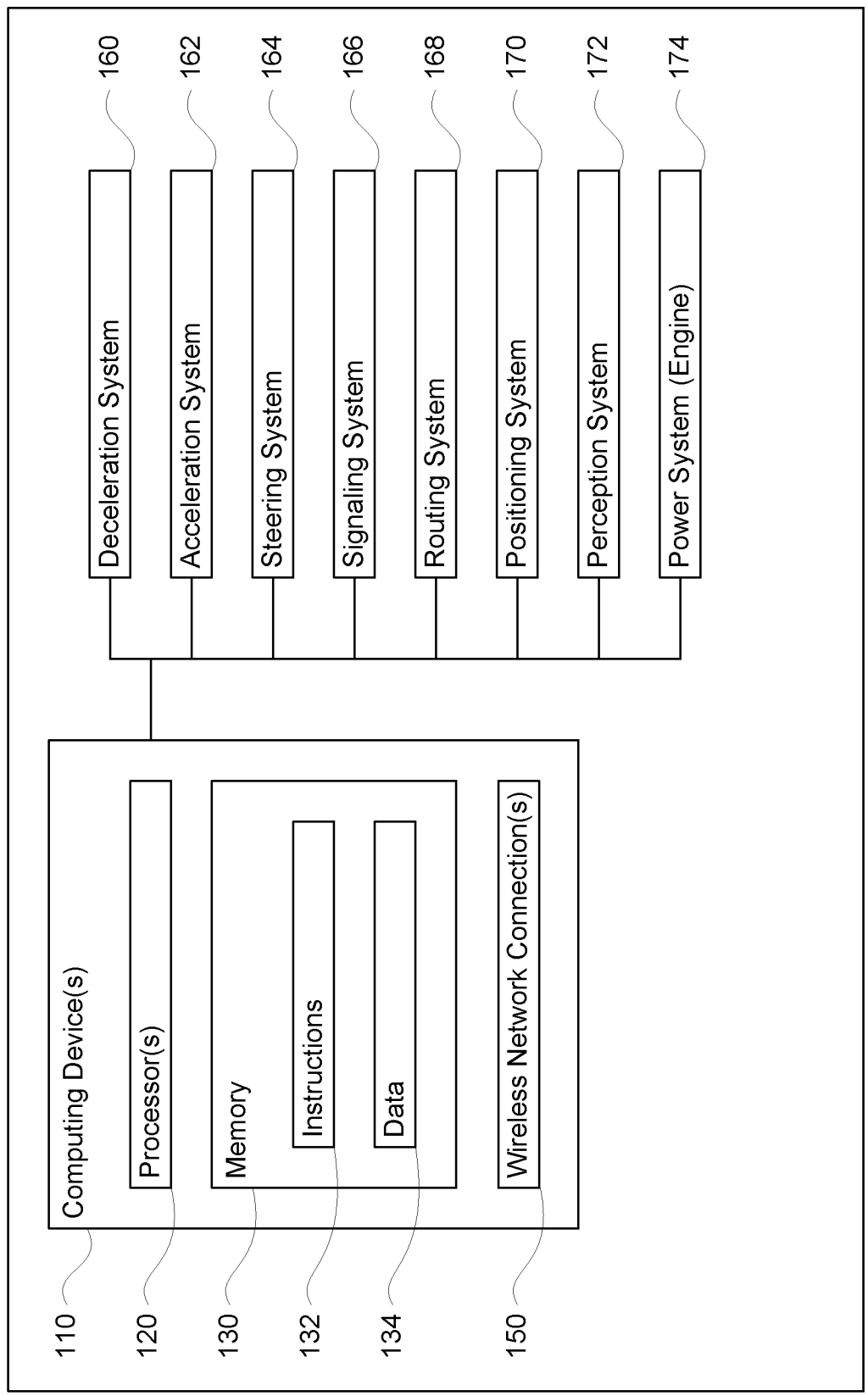
FIG. 1 is a functional diagram of an example vehicle in accordance with an exemplary embodiment.

Aspects of the disclosure provide a method of localizing a vehicle. The method includes identifying, by one or more processors, a weather condition in which the vehicle is currently driving; receiving, by the one or more processors, a first sensor input having intensity information, a second sensor input having elevation information, and a third sensor input having radar sensor information; determining, by the one or more processors, for each of the first, second, and third sensor inputs, an alignment and a corresponding alignment score by comparing that sensor input to a corresponding pre-stored image for that sensor input; determining, by the one or more processors, a set of weights based on the identified weather condition; and combining, by the one or more processors, the alignments and alignment scores using the set of weights in order to localize the vehicle.

In one example, the intensity information and elevation information are generated by one or more LIDAR sensors. In another example, the weather condition is identified from weather information received from a remote source. In another example, the weather condition is identified from a sensor of the vehicle. In another example, determining the set of weights includes adjusting default weights for one or more of the first, second, and third sensor inputs. In another example, determining the set of weights includes identifying a pre-stored set of weights for the identified weather condition. In another example, when the identified weather condition corresponds to a snowy condition, the determined set of weights includes an increased weight for radar sensor information as compared to a default weight for intensity information for non-snowy conditions. In another example, when the identified weather condition corresponds to a snowy condition, the determined set of weights includes a decreased weight for intensity information as compared to a default weight for intensity information for non-snowy conditions. In another example, when the identified weather condition corresponds to a snowy condition, the determined set of weights includes a decreased weight for elevation information as compared to a default weight for elevation information for non-snowy conditions. In another example, when the identified weather condition corresponds to a snowy condition, the determined set of weights includes a decreased weight for sensor input corresponding to objects within a roadway as compared to a default weight for sensor input corresponding to objects within a roadway for non-snowy conditions. In another example, when the identified weather condition corresponds to a snowy condition, the determined set of weights includes an increased weight for sensor input corresponding to objects outside a roadway as compared to a default weight for sensor input corresponding to objects outside a roadway for non-snowy conditions. In another example, when the identified weather condition corresponds to a rainy or wet condition, the determined set of weights includes an increased weight for elevation information as compared to a default weight for elevation information for dry conditions. In another example, when the identified weather condition corresponds to a rainy or wet condition, the determined set of weights includes a decreased weight for intensity information as compared to a default weight for intensity information for dry conditions. In another example, the method also includes identifying a weather impacted area on a roadway, and determining the set of weights includes determining one or more weights for one or more of the first, second, or third sensor inputs for the weather impacted area. In this example, the weather impacted area is one of a puddle, snow pile, or ice patch. In addition or alternatively, the determined set of weights includes a decreased weight for sensor input for the weather impacted area as compared to a default weight for non-weather impacted areas. In another example, determining an alignment, for each of the first, second, and third sensor inputs, includes determining a physical positioning between each sensor input and the corresponding pre-stored image for that sensor input. In another example, determining an alignment, for each of the first, second, and third sensor inputs, includes determining an offset between each sensor input and the corresponding pre-stored image for that sensor input. In another example, determining an alignment, for each of the first, second, and third sensor inputs, includes determining an image correlation between each sensor input and the corresponding pre-stored image for that sensor input. In another example, the image correlation includes determining a sum of products of corresponding pixels between each sensor input and the corresponding pre-stored image for that sensor input.

DETAILED DESCRIPTION

Overview

The technology relates to localizing an autonomous vehicle. One type of localization scheme compares a set of pre-mapped known images (e.g. one for each type of sensor used to generate the image) against the vehicle's current sensor data. For example, a localization scheme may include generating a map or image using sensor inputs from a particular type of sensor and comparing that image to pre-stored map information to determine an alignment and an alignment score. The alignment scores and alignments for different sensor inputs may be fed into a probabilistic filter which tracks different hypotheses of locations of the vehicle over time. In order to combine the alignments and alignment scores effectively, those for different sensor inputs may be weighted when input into the probabilistic filter. In other words, certain inputs may be trusted more than others and/or certain features may be trusted more than others.

However, when road surface conditions change, the sensor data will be impacted and therefore the localization scheme will perform less effectively. For instance, road surface conditions and other object surfaces may determine the reflectivity of the laser or radar beams. For example, wet surfaces are less reflective than dry surfaces, which may decrease the intensity of LIDAR sensor data. As another example, accumulated snow or ice may change the elevation of the LIDAR data points.

In order to improve the localization scheme's performance as conditions change, the weights may be adjusted. To do so, the vehicle's computing devices must first detect or identify weather conditions. Once a weather condition is identified, the default weights of the localization scheme may be adjusted. For instance, different pre-tuned weights may be used depending upon the identified weather condition. These may be pre-stored in a table or may be incorporated in pre-stored equations, etc.

The features described herein may provide for a reliable and effective system for localizing a vehicle as weather conditions change. In other words, the weighting of reliance on different localization schemes is effectively adapted based on the current weather condition. In this regard, weather forecasts and/or weather condition detection are used to adapt the entire localization process to utilize the most effective map-matching approach given the weather condition.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers as well as one or more user inputs. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may include one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
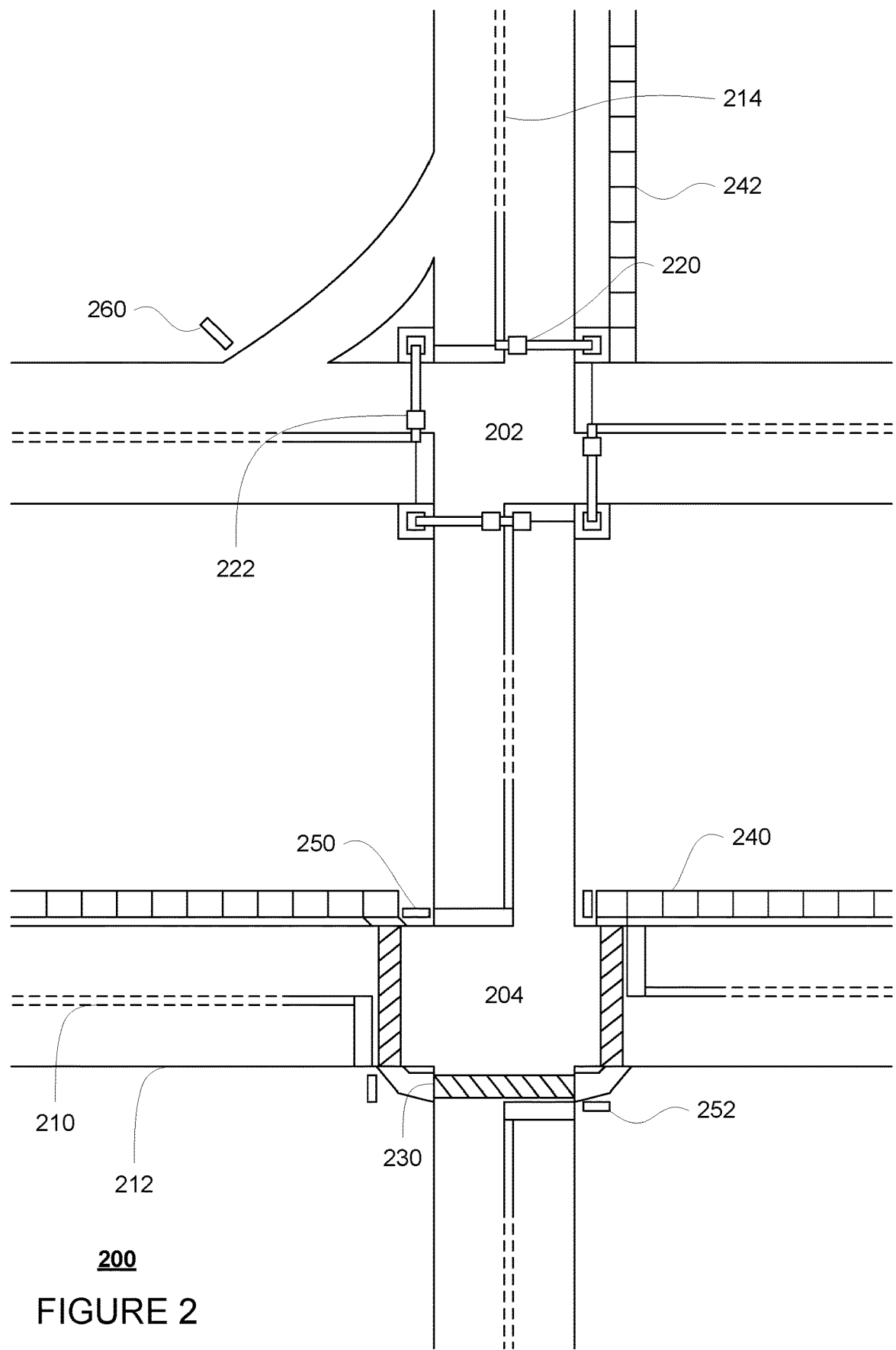
FIG. 2 is an example of map information in accordance with aspects of the disclosure.

FIG. 2 is an example of map information 200 for a section of roadway including intersections 202, 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, 242, stop signs 250, 252, and yield sign 260. In this regard, the map information includes the three-dimensional (3D) locations of traffic lights 220, 222 as well as information identifying the lanes which are controlled by these traffic lights.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. For instance, positioning system 170 and/or data 134 may store mages of sensor information which can be used to determine the vehicle's position relative to the pre-stored map information 200 as discussed further below. These pre-stored images may include, for instance, sensor data generated by various sensors of a perception system, such as perception system 172 of vehicle 100. In this regard, the pre-stored images may include images generated from sensor data collected for the area of the pre-stored map information, including the map information 200 described above. These pre-stored images may be "top-down" views of areas generated from different types of sensor data such as intensity information from a LIDAR sensor, elevation information from a LIDAR sensor, as well as radar returns from a radar sensor. In this regard, for the map information 200, the positioning system may access a corresponding pre-stored image for each of: intensity information from a LIDAR sensor, elevation information from a LIDAR sensor, and radar sensor information from a radar sensor, or rather, three different pre-stored images.

Figure 6:
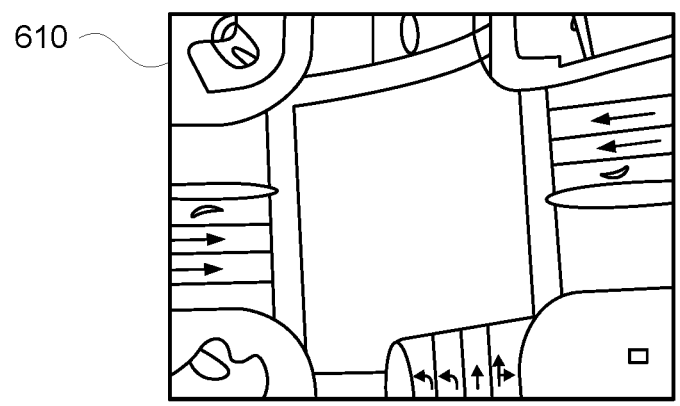
FIG. 6 is an example of pre-stored images in accordance with aspects of the disclosure.
Figure 6:
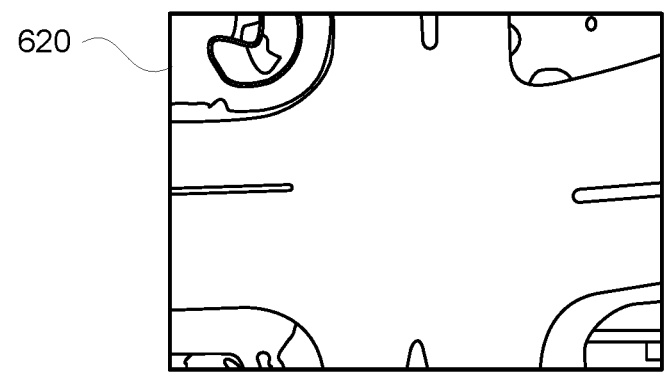
Figure 6:
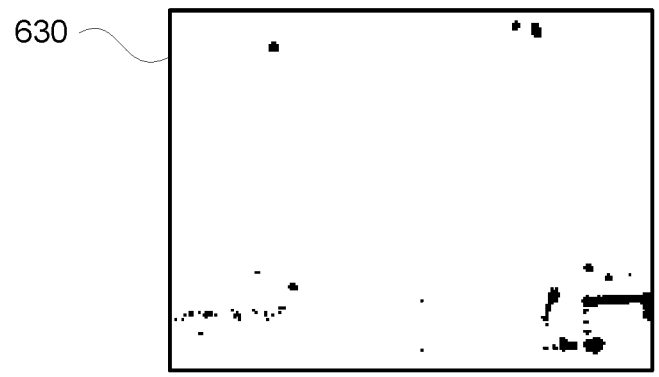

FIG. 6 depicts hypothetical examples of pre-stored images 610, 620, 630. For example, pre-stored image 610 is an example hypothetical representation of a pre-stored image for an area generated from intensity information from a LIDAR sensor. Pre-stored image 620 is an example hypothetical representation of a pre-stored image for the same area generated from elevation information from a LIDAR sensor. Pre-stored image 310 is an example hypothetical representation of a pre-stored image for the same area generated from radar returns from a radar sensor.

Figure 7:
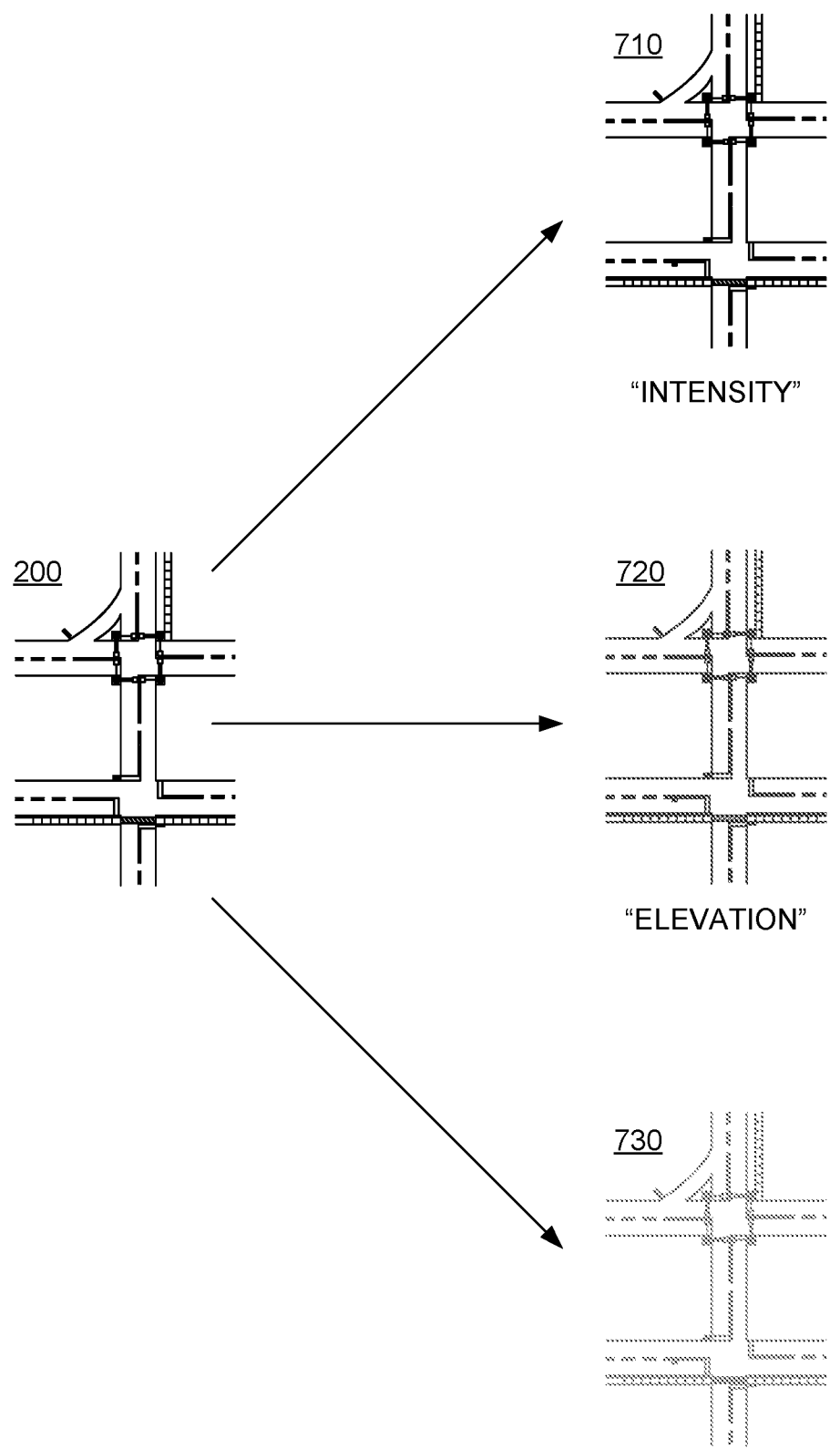
FIG. 7 is an example of pre-stored images in accordance with aspects of the disclosure.

FIG. 7 provides another hypothetical examples of pre-stored images corresponding to the area of the map information 200. In this example, each of the pre-stored images 710, 720, 730 may have been generated from intensity information from a LIDAR sensor, elevation information from a LIDAR sensor, and radar sensor information from a radar sensor. The positioning system may then use real time sensor data and the pre-stored images to localize the vehicle, or rather, to determine vehicle 100's location relative to the pre-stored images. To do so, the memory of the positioning system 170 and/or memory 130 may store sets of weights as discussed further below.

The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
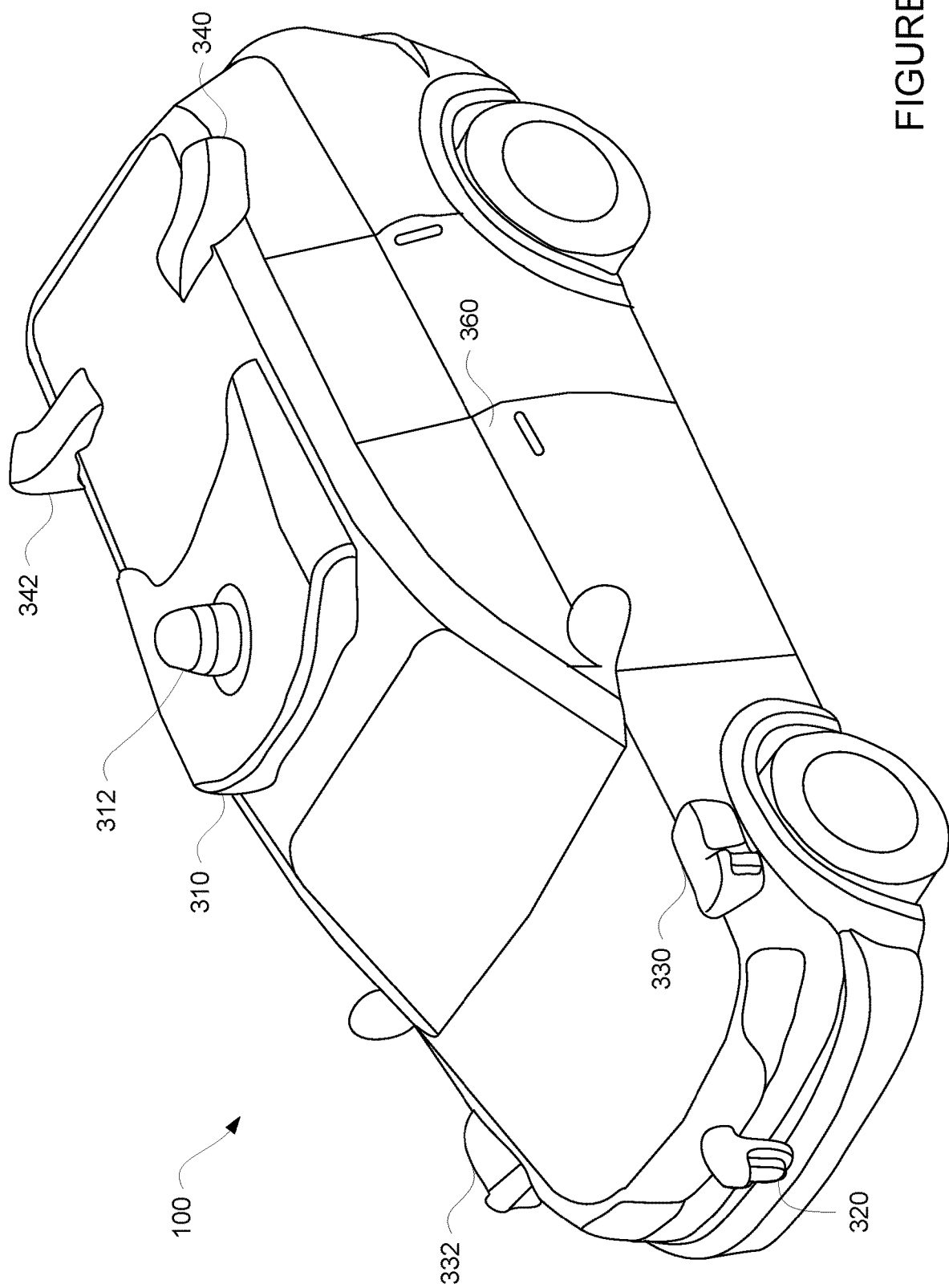
FIG. 3 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
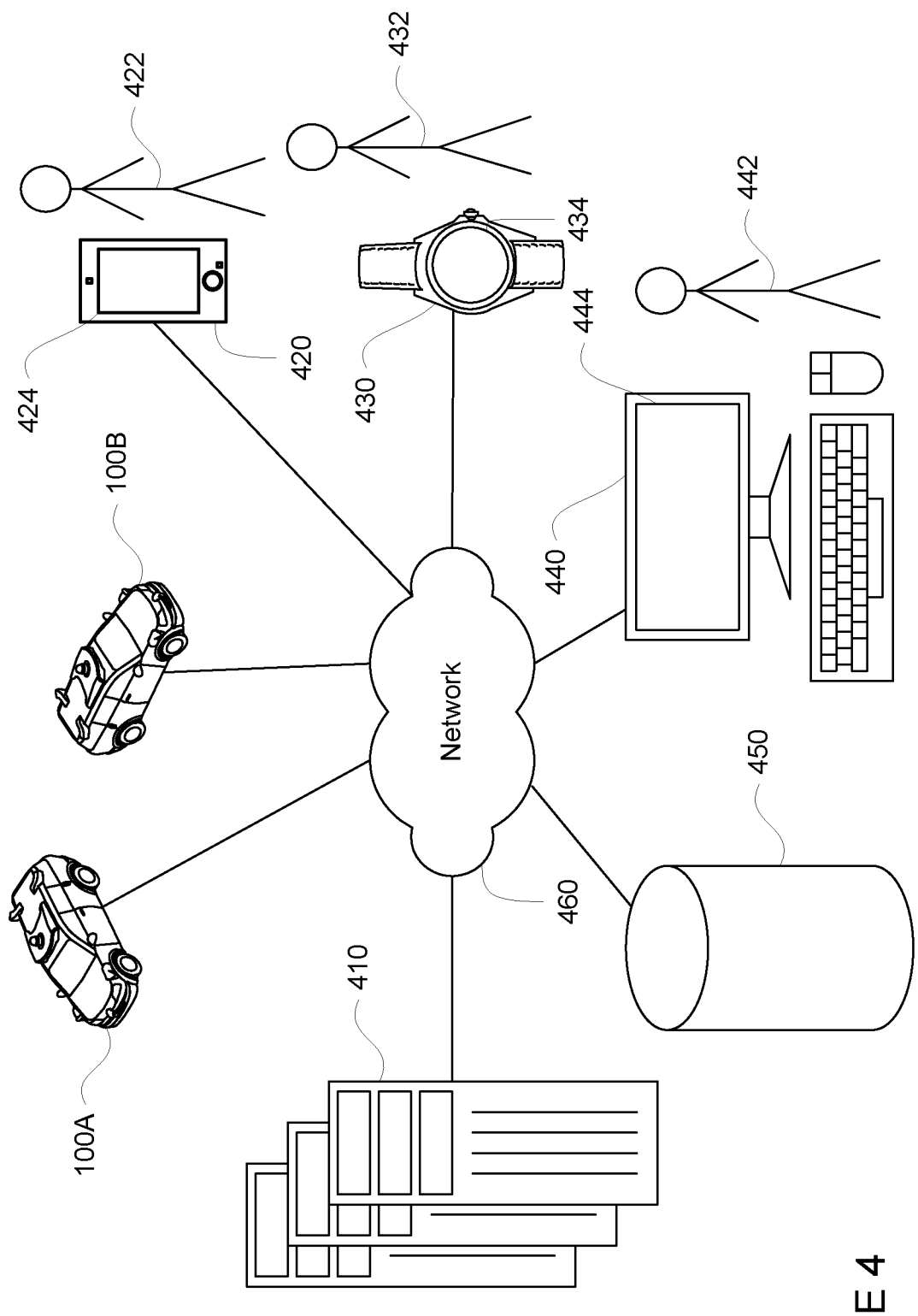
FIG. 4 is an example pictorial diagram of a system in accordance with aspects of the disclosure.
Figure 5:
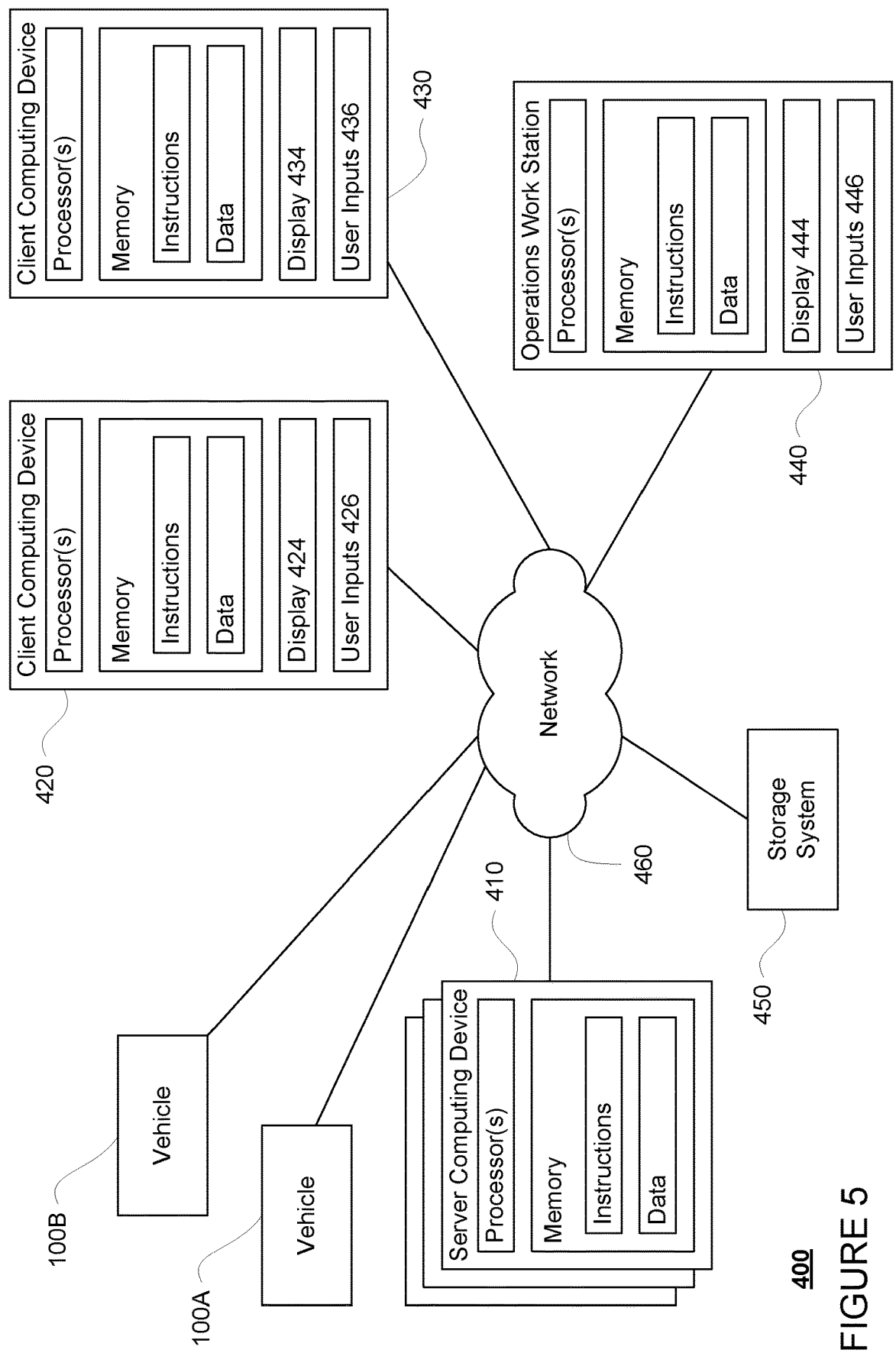
FIG. 5 is an example functional diagram of a system in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations workstation is depicted as a desktop computer, operations work stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage information may store current weather conditions. Such weather conditions may be reported by the vehicles of the fleet, current and future predicted weather conditions received from various third-party commercial or government weather services, historical climate data (e.g. it's typically dry in Mountain View during the summer), historical weather prediction data, real-time observations recorded by humans (e.g. humans conduct puddle scouting), machine-learned or other models of weather data or predictions (e.g. a service that looks at one-hour forecasts made by third-party weather service A and produces refined estimates based on current conditions according to government weather services), or a combination of any or all of the above.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
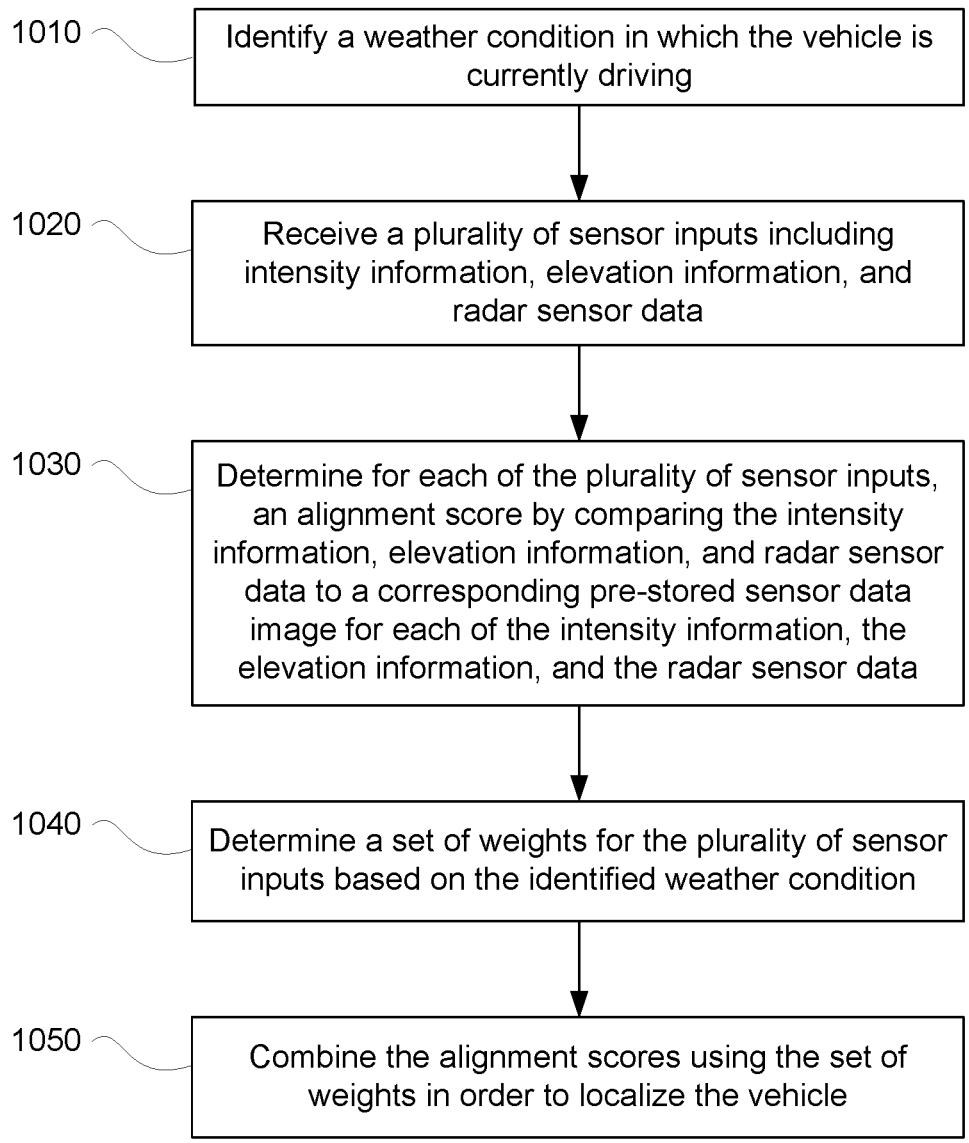
FIG. 10 is an example flow diagram in accordance with aspects of the disclosure.

FIG. 10 includes an example flow diagram 1000 of some of the examples for localizing a vehicle, such as vehicle 100, which may be performed by one or more processors such as processors of computing devices 110 and/or processors of the positioning system 170. For instance, at block 1010, a weather condition in which the vehicle is currently driving is identified. Weather conditions can be identified in different ways. For instance, weather conditions can be identified from weather forecasts or estimations from a remote source such as the server computing devices 410 (e.g. from weather information stored in the storage system 450), another vehicle with attached sensors which sends information to other vehicles of the fleet about current conditions, or from sensors of the vehicle 100 itself. For example, weather conditions can be detected using sensors on the vehicle which may detect precipitation (e.g. an infrared precipitation sensor or moisture sensor). Such information may provide details about whether it is currently raining or has recently rained in the area where the vehicle is driving.

Turning to block 1020 of FIG. 10, a plurality of sensor inputs including intensity information, elevation information, and radar sensor information. For instance, these sensor inputs may be generated by the sensors of the perception system 172, including LIDAR and radar sensors. The sensor inputs may include intensity information from a LIDAR sensor, elevation information from the same or a different LIDAR sensor, and radar sensor information from a radar sensor.

Figure 8:
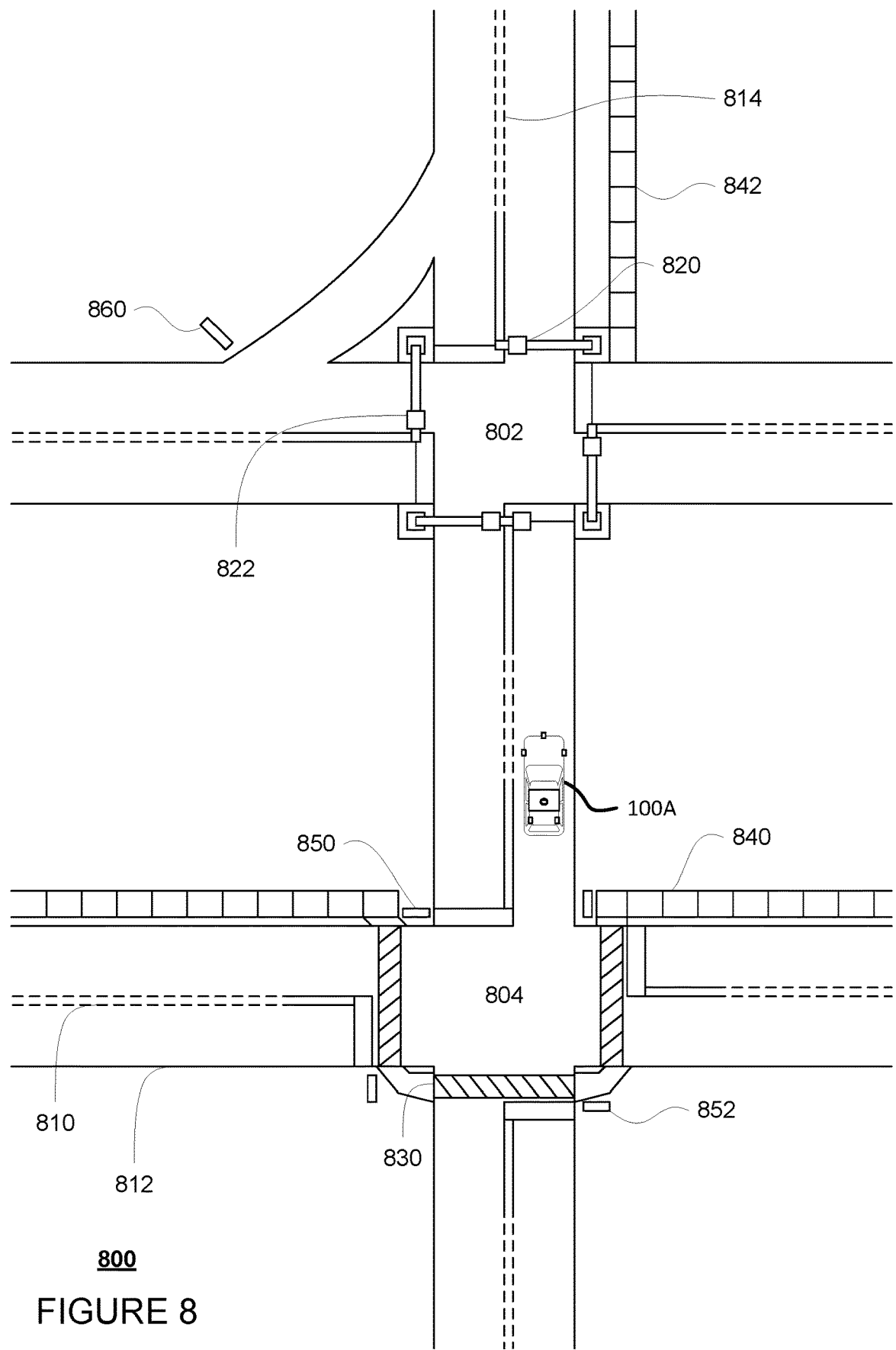
FIG. 8 is an example of a vehicle and a portion of roadway in accordance with aspects of the disclosure.

FIG. 8 is an example of vehicle 100 driving on a section of roadway 800 corresponding to the map information 200. In this regard, the shape, location and other characteristics of intersections 802, 804 correspond to the shape, location and other characteristics of intersections 202, 204. Similarly, the shape, location, and other characteristics of lane lines 810, 812, 814, traffic lights 820, 822, crosswalk 830, sidewalks 840, 842, stop signs 850, 852, and yield sign 860, correspond to the shape, location, and other characteristics of lane lines 210, 212, 214, traffic lights 220, 222, crosswalk 230, sidewalks 240, 242, stop signs 250, 252, and yield sign 260, respectively.

As noted above, the positioning system 170 may use a localization scheme to determine a location of the vehicle relative to the map information and pre-stored images, such as the map information 200 and pre-stored images 710, 720, 730. The localization scheme may include generating a map or image using sensor inputs from a particular type of sensor input. The images may be projected according to local inertial measurements (e.g. from accelerometers, gyroscopes, and other devices) of the positioning system 170. In this regard, different images may be built using the different sensor inputs including intensity information from the LIDAR sensor, elevation information from the LIDAR sensor, and sensor data from a radar sensor.

For example, for a LIDAR sensor, each pulse of laser light reflects off one or more objects. The LIDAR sensor knows the direction the LIDAR sensor was facing when the pulse was sent and received. The LIDAR sensor can determine how far away the object was using the round-trip timing of the pulse. This combined with the direction may provide the object's location in three-dimensional space. The object's location in three-dimensional space can be projected into a two-dimensional or flat map (disregarding elevation). The intensity information of the returned pulse as a value for a grayscale image. In some instances, certain objects are filtered for elevation, such as to remove a vehicle, in order to provide only the height of the road surface rather than that of another vehicle. The result is an image for the intensity information for the LIDAR sensor.

The elevation image uses the elevation information determined by the LIDAR sensor for the value of a grayscale image, using the same process to place pixels on the image. In this regard, the height of the lowest point where an object was for a given (x, y) coordinate. The result is an image for the elevation information of the LIDAR sensor.

Figure 9:
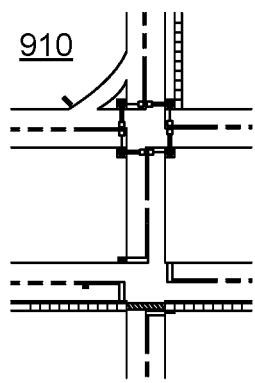
FIG. 9 is an example comparison of images in accordance with aspects of the disclosure.
Figure 9:
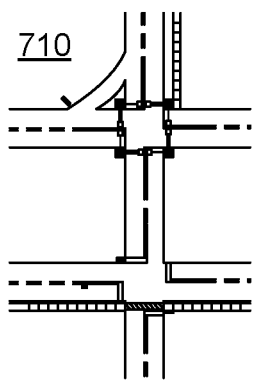
Figure 9:
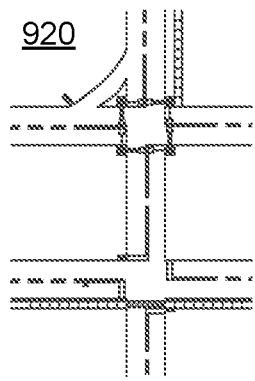
Figure 9:
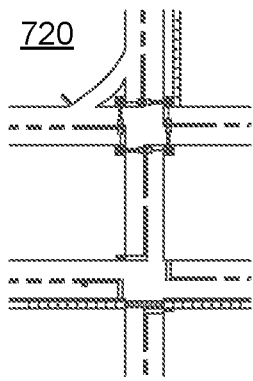
Figure 9:
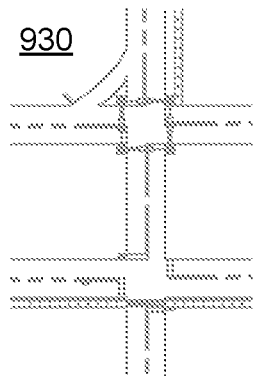
Figure 9:
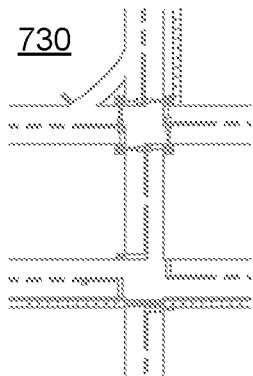

Sensor data from a radar sensor, or radar returns, may be processed in a similar way. Returns from pulses of light are used to identify where another moving object is located relative to the vehicle 100. The intensity of the radar returns is attached to points in three-dimensional space, determine the (x, y) coordinates of these radar returns, and use the intensity of a radar return for a given coordinate as a value for the corresponding pixel in a grayscale image. The result is an image for the sensor data of a radar sensor. Turning to FIG. 9, sensor data inputs from the perception system 172 including intensity information, elevation information, and radar sensor data may be used to generate images 910, 920, 930, respectively corresponding to the example of FIG. 8.

Turning to block 1030 of FIG. 10, for each of the plurality of sensor inputs, an alignment score is determined by comparing the intensity information, elevation information, and radar sensor information to a corresponding pre-stored image for each of the intensity information, the elevation information, and the radar sensor information. Each image may be compared or rather aligned to a pre-stored image to determine an alignment and an alignment score. In this regard, an alignment may be a particular physical positioning or offset between the map and the sensor image. An alignment score may refer to an "image correlation" or any such algorithm for comparing the similarity pixels of two images. As an example, an image correlation may include determining the sum of the products of the corresponding pixels of the images at the given alignment. This may be performed on the gradients of the images to be more robust to changes in illumination. Many correlation scores can be computed at once using the Fast Fourier Transform. For example, returning to FIG. 9, image 910 may be compared to pre-stored image 710, image 920 may be compared to pre-stored image 720, and image 930 may be compared to pre-stored image 730.

The alignment scores and alignments for different sensor inputs may be combined in order to localize the vehicle 100. In order to combine the alignment scores and alignments effectively, those alignments and alignment scores for different sensor inputs may be weighted differently. In other words, certain sensor inputs may be trusted more than others and/or certain features may be trusted more than others. For instance, for fair weather conditions, elevation information can be weighted more than intensity information because intensity often corresponds to lane markers which are relatively easy to change and elevation is less likely to change. In some instances, the weights may be normalized to sum to 1 and used to combine the alignment scores linearly. For example, in fair weather conditions or as a default (e.g. not rainy, foggy, snowy, etc. and when the vehicle's sensors are not otherwise damaged or experiencing other hardware failures likely to affect the sensors), the set of weights may include 0.1 for the radar sensor data, 0.3 for intensity information, and 0.6 for elevation information.

For each set of alignments and alignment scores for the different sensor inputs for a given point in time, these weights may be used to estimate a location of the vehicle. For example, the alignments, alignment scores, and weights may be input into a probabilistic filter to estimate the location of the vehicle. The probabilistic filter may track the different alignments (i.e. different location hypotheses) and provide an estimate which may correspond to one or a combination of the different alignments.

In other words, the probabilistic filter may use the alignments, alignment scores, and set of weights to determine the "best" estimate of the vehicle's location. The probabilistic filter may essentially use the set of weights and alignment scores to arbitrate among the different alignments. Thus, for one alignment with a higher alignment score and a higher weight than two other alignments, the estimated location of the vehicle may be closer to the one alignment than the other two alignments. Similarly, for one alignment with a lower alignment score and a lower eight than two other alignment scores, the estimated location of the vehicle may be closer to each of the two other alignments than the first alignment.

In some examples, this may effectively include combining the set of alignment scores as a linear sum using the weights. Using the example of the set of weights for fair weather, the alignment scores may be combined using the following formula: (radar sensor information alignment score)*0.1+ (intensity alignment score)*0.3+(elevation alignment score) *0.6.

In addition or alternatively, certain individual features may be trusted more than others when generating the alignment scores for the different sensor inputs. For example, curbs can be weighted lower than buildings as curbs are more likely to change over time than buildings.

At block 1040 of FIG. 10, a set of weights for the plurality of sensor inputs is determined based on the identified weather condition. When road surface conditions change, the sensor data generated by the perception system 172 will be impacted and therefore the localization scheme will perform less effectively. For instance, road surface conditions and other object surfaces may determine the reflectivity of the laser or radar beams. For example, wet surfaces are more reflective than dry surfaces, which may increase the intensity of LIDAR sensor data. As another example, accumulated snow or ice may change the elevation of the LIDAR data points.

In this regard, once a weather condition is identified, the default weights of the localization scheme may be adjusted or rather, a different set of weights may be identified from the memory of the positioning system 170 and/or the memory 130. For instance, different predetermined (e.g. pre-stored and/or pre-tuned) weights may be used for the different alignments and/or alignment scores depending upon the identified weather condition. These may be handtuned and pre-stored in a table or may be incorporated in pre-stored equations, etc. stored in the memory 130 and/or memory of the positioning system 170.

For example, during snowy conditions, radar sensor information may be more reliable than intensity information as a snowy surface as snow inhibits lidar reflectivity, though radar sensor information may only be available when traveling above certain low speeds. As such, during snowy conditions, the weight of radar sensor information may be increased and the weights of intensity information may be decreased. Similarly, when driving on accumulated snow or ice, the elevation information can become less reliable, and thus, the weights of elevation information may be decreased. In addition, when the ground is snow covered, it can be difficult to localize based on curbs, lane lines, etc. Thus, the weights may be adjusted to increase those weights for intensity of objects that are outside of the road such as trees, signs, buildings, etc.

In other instances, in rainy or wet conditions, elevation information may be more reliable than intensity information, and thus, the weights of elevation information may be increased and the weights of intensity information may be decreased. In addition or as an alternative to adjusting the weights in rainy conditions, a filter may be applied to the intensity information to address expected changes to the intensity information (as compared to dry conditions). In this regard, weather data to change the images in the hopes of producing a better match or rather, better alignment scores. For instance, if the vehicle's computing devices know that it is raining, with fog decreasing visibility, the alignment score could be improved by cropping the image to the visibility radius. Similarly, if rain dampens or enhances the intensity of various surfaces, how this affects the image could be modeled, and a corresponding transformation could be to the image before the matching process.

In some instances, if the position of weather impacted areas can be determined (e.g. the location of puddles, snow piles, ice patches, etc.), the sensor inputs for these areas can be adjusted when generating the images or the pre-stored images themselves can be adjusted. For example, the elevation from the sensor inputs can be adjusted in those areas. As another example, a known snow pile will create a higher elevation change in a small area. In this regard, the corresponding map information could be adjusted to match the accumulated snow rather than the expected (non-snow) conditions.

As shown in block 1050 of FIG. 10, the alignment scores are combined using the set of weights in order to localize the vehicle. For a given sensor input, the pre-stored image and the generated image are compared, producing an alignment and alignment score. Each alignment provides a hypothesis of the offset of the vehicle's pose (position and orientation) from the pre-stored images. The weight for each hypothesis may correspond to the product of the alignment scores across individual sensor inputs. This weighted average of hypotheses may be the output pose offset, and the overall alignment score may provide the weight of the best hypothesis. This may provide a way to choose the "best" alignment hypothesis across different sensor inputs given the alignment scores for each sensor input and hypothesis. For instance, returning to the example above, where the set of weights for fair or default weather conditions 0.1 for the radar sensor information, 0.3 for intensity information, and 0.6 for elevation information, in snowy weather conditions, where intensity is less useful, the set of weights may include 0.4 for the radar sensor information, 0.1 for intensity information, and 0.5 for elevation information. The alignments, alignment scores, and the set of weights may be input into a probabilistic filter in order to estimate a location of the vehicle. Using the above values, in the case where the alignment scores are combined using a linear sum, the alignment scores may be combined using the following formula: (radar sensor information alignment score)*0.4+(intensity alignment score)*0.1+(elevation alignment score)*0.5.

Similarly, in rain, where intensities can change in both directions, a subtler adjustment may be made where the set of weights may include 0.2 for the radar sensor information, 0.2 for intensity information, and 0.6 for elevation information. The alignments, alignment scores, and the set of weights may be input into a probabilistic filter in order to estimate a location of the vehicle. Using the above values, in the case where the alignment scores are combined using a linear sum, the alignment scores may be combined using the following formula: (radar sensor information alignment score)*0.2+(intensity alignment score)*0.2+(elevation alignment score)*0.6.

In a combination of rain and fog, supposing the two cause too much noise for radar to be useful, the radar sensor information may be ignored entirely by setting its weight to 0. Thus, the set of weights may include 0.0 for the radar sensor information, 0.3 for intensity information, and 0.7 for elevation information. The alignments, alignment scores, and the set of weights may be input into a probabilistic filter in order to estimate a location of the vehicle. In the case where, the alignment scores are combined using a linear sum, the alignment scores may be combined using the following formula: (radar sensor data alignment score)*0.0+ (intensity alignment score)*0.3+(elevation alignment score) *0.7.

The probabilistic filter may also take into account updates from the LIDAR sensor and/or radar sensor using the alignment scores for each alignment. The positioning system 170 may therefore publish such hypotheses of locations which can then be used by the various systems of the vehicle 100 described above in order to control the vehicle 100 in the autonomous driving mode in order to follow a route and trajectories to a destination. The published results should be the best hypothesis and any necessary offset ("pose correction"). In some instances, another output may include an error in the case that none of the alignment scores were good enough (or there is disagreement between the different sensor inputs). This may occur in circumstances in which the world has changed (such that the pre-stored images are out of date or no longer reliable), during initialization when the localization is more of a rough guess and may not be utilizing the most relevant pre-stored images, when sensors are not performing as expected (e.g. due to rain, fog, damage, hardware failure, etc.), when there are accumulated errors in pose which can lead to a mismatch (e.g. due to a bug in other parts of software, etc.), etc.

In some instances, if the position of weather impacted areas can be determined (e.g. the location of puddles, snow piles, ice patches, etc.), these areas can be ignored when comparing the image to the map information. As one approach, anomalous features may be removed before the aforementioned comparison. Instead of adding such features to the prior map, the vehicle's computing devices could attempt to removement. For example, accumulated snow could be removed from the image generated using the sensor data. As another example, reflective puddles from the image could be removed since the road surface will not match the same intensity.

As an alternative to adjusting the default weights using pre-stored weights, the weights may be adjusted in real time, for instance using an iterative approach in order to find a set of weights that provides an alignment score with the highest confidence. One possible approach may be to use a few known weather configurations as environment hypotheses. Instead of using just one (the good or fair-weather hypothesis), many different hypotheses could be attempted, and the vehicle's computing devices may dynamically switch to other weight configurations if they perform better. As an alternative, a few alternative hypotheses could be generated using small adjustments to the weights and allow a more successful hypothesis to determine the weights. In some instances, rather than directly identifying a weather condition, the confidence in the alignment score may be used to determine whether to adjust the weights which in turn, can be used to identify a weather condition. For example, if the confidence is very low, the weights may be adjusted using different combinations of weights corresponding to different weather conditions. The weights that result in the highest confidence score may then be used, and the weather condition associated with those weights may be identified as a current weather condition. For example, if the current sensor inputs point towards the "snowy condition" weights, this may suggest that the vehicle is currently driving in snowy conditions.

Alternatively, rather than adjusting the weights, different pre-stored pre-stored images may be used. For example, different pre-stored images may be generated for different weather conditions and then compared to the images generated using the default values. In this regard, when a weather condition is identified, the map that matches this weather condition may be used when performing the comparison.

In some instances, these adjustments may be shared with other vehicles of a fleet of autonomous vehicles. In this regard, a vehicle that needed to adjust its weights could broadcast or otherwise share the information with other vehicles in the fleet, potentially allowing those other vehicles to converge more quickly or maintain localization in difficult conditions.

The features described herein may provide for a reliable and effective system for localizing a vehicle as weather conditions change. In other words, the weighting of reliance on different localization schemes is effectively adapted based on the current weather condition. In this regard, weather forecasts and/or weather condition detection are used to adapt the entire localization process to utilize the most effective map-matching approach given the weather condition.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of localizing a vehicle, the method comprising:
identifying, by one or more processors, a weather condition in which the vehicle is currently driving;
receiving, by the one or more processors, a first sensor input having intensity information, a second sensor input having elevation information, and a third sensor input having radar sensor information;
determining, by the one or more processors, for each of the first, second, and third sensor inputs, an alignment and a corresponding alignment score by comparing that sensor input to a corresponding pre-stored image for that sensor input;
determining, by the one or more processors, a set of weights based on the identified weather condition; and
combining, by the one or more processors, the alignments and alignment scores using the set of weights in order to localize the vehicle.

2. The method of claim 1, wherein the intensity information and elevation information are generated by one or more LIDAR sensors.

3. The method of claim 1, wherein when the weather condition is identified from weather information received from a remote source.

4. The method of claim 1, wherein the weather condition is identified from a sensor of the vehicle.

5. The method of claim 1, wherein determining the set of weights includes adjusting default weights one or more of the first, second, and third sensor inputs.

6. The method of claim 1, wherein determining the set of weights includes identifying a pre-stored set of weights for the identified weather condition.

7. The method of claim 1, wherein when the identified weather condition corresponds to a snowy condition, the determined set of weights includes an increased weight for radar sensor information as compared to a default weight for intensity information for non-snowy conditions.

8. The method of claim 1, wherein when the identified weather condition corresponds to a snowy condition, the determined set of weights includes a decreased weight for intensity information as compared to a default weight for intensity information for non-snowy conditions.

9. The method of claim 1, wherein when the identified weather condition corresponds to a snowy condition, the determined set of weights includes a decreased weight for elevation information as compared to a default weight for elevation information for non-snowy conditions.

10. The method of claim 1, wherein when the identified weather condition corresponds to a snowy condition, the determined set of weights includes a decreased weight for sensor input corresponding to objects within a roadway as compared to a default weight for sensor input corresponding to objects within a roadway for non-snowy conditions.

11. The method of claim 1, wherein when the identified weather condition corresponds to a snowy condition, the determined set of weights includes an increased weight for sensor input corresponding to objects outside a roadway as compared to a default weight for sensor input corresponding to objects outside a roadway for non-snowy conditions.

12. The method of claim 1, wherein when the identified weather condition corresponds to a rainy or wet condition, the determined set of weights includes an increased weight for elevation information as compared to a default weight for elevation information for dry conditions.

13. The method of claim 1, wherein when the identified weather condition corresponds to a rainy or wet condition, the determined set of weights includes a decreased weight for intensity information as compared to a default weight for intensity information for dry conditions.

14. The method of claim 1, further comprising, identifying a weather impacted area on a roadway, and wherein determining the set of weights includes determining one or more weights for one or more of the first, second, or third sensor inputs for the weather impacted area.

15. The method of claim 14, wherein the weather impacted area is one of a puddle, snow pile, or ice patch.

16. The method of claim 14, wherein the determined set of weights includes a decreased weight for a sensor input for the weather impacted area as compared to a default weight for non-weather impacted areas.

17. The method of claim 1, wherein determining an alignment, for each of the first, second, and third sensor inputs, includes determining a physical positioning between each sensor input and the corresponding pre-stored image for that sensor input.

18. The method of claim 1, wherein determining an alignment, for each of the first, second, and third sensor inputs, includes determining an offset between each sensor input and the corresponding pre-stored image for that sensor input.

19. The method of claim 1, wherein determining an alignment, for each of the first, second, and third sensor inputs, includes determining an image correlation between each sensor input and the corresponding pre-stored image for that sensor input.

20. The method of claim 19, wherein the image correlation includes determining a sum of products of corresponding pixels between each sensor input and the corresponding pre-stored image for that sensor input.

* * * * *